US011643157B1

(12) United States Patent
Ritter et al.

(10) Patent No.: US 11,643,157 B1
(45) Date of Patent: May 9, 2023

(54) TOWABLE TRAILERS AND MOTORIZED HOMES WITH AN EXOSKELETON

(71) Applicant: Winnebago Industries Inc., Forest City, IA (US)

(72) Inventors: Robert Ritter, Clear Lake, IA (US); Matthew Clements, Lake Mills, IA (US)

(73) Assignee: Winnebago Industries Inc., Eden Prairie, MN (US)

( * ) Notice: Subject to any disclaimer, the term of this patent is extended or adjusted under 35 U.S.C. 154(b) by 0 days.

(21) Appl. No.: 17/677,244

(22) Filed: Feb. 22, 2022

Related U.S. Application Data

(63) Continuation of application No. 16/901,586, filed on Jun. 15, 2020, now Pat. No. 11,254,380, which is a continuation of application No. 16/105,187, filed on Aug. 20, 2018, now Pat. No. 10,683,047.

(60) Provisional application No. 62/547,495, filed on Aug. 18, 2017.

(51) Int. Cl.
| | |
|---|---|
| *B62D 63/06* | (2006.01) |
| *B62D 63/08* | (2006.01) |
| *B62D 21/03* | (2006.01) |
| *B62D 27/00* | (2006.01) |
| *B60P 3/32* | (2006.01) |
| *B60R 9/00* | (2006.01) |
| *E04H 15/08* | (2006.01) |

(52) U.S. Cl.
CPC ............. *B62D 63/08* (2013.01); *B60P 3/32* (2013.01); *B60R 9/00* (2013.01); *B62D 21/03* (2013.01); *B62D 27/00* (2013.01); *B62D 63/062* (2013.01); *E04H 15/08* (2013.01)

(58) Field of Classification Search
CPC .... B62D 63/06; B62D 63/062; B62D 63/064; B62D 63/08; B62D 21/03; B62D 27/00; B60P 3/32; B60R 9/00; E04H 15/08
See application file for complete search history.

(56) References Cited

U.S. PATENT DOCUMENTS

| | | | |
|---|---|---|---|
| 2,493,258 A | 1/1950 | Massare | |
| 2,894,783 A | 7/1959 | Bird | |
| 3,304,668 A | 2/1967 | Edmonds | |
| 3,807,789 A | 4/1974 | Turquin | |
| 4,261,329 A * | 4/1981 | Walsh | F24S 20/50 180/2.2 |
| 4,420,165 A | 12/1983 | Goodin | |
| 5,969,501 A * | 10/1999 | Glidden | H02S 20/30 320/136 |
| 7,000,978 B1 * | 2/2006 | Messano | B62D 29/046 296/181.6 |
| 7,100,625 B2 | 9/2006 | Valles | |

(Continued)

OTHER PUBLICATIONS

SylvanSport; Go Photo Gallery; https://www.sylvansport.com/go/gallery/Accessed Jul. 22, 2018, 9 pages.

*Primary Examiner* — Gregory A Blankenship
(74) *Attorney, Agent, or Firm* — Faegre Drinker Biddle & Reath LLP

(57) ABSTRACT

A trailer includes a housing including an internal frame and an external frame. The external frame is coupled to the internal frame. In certain embodiments, the internal frame is positioned between interior panels and exterior panels of the housing. In certain embodiments, the external frame is spaced from exterior panels.

17 Claims, 5 Drawing Sheets

(56) References Cited

U.S. PATENT DOCUMENTS

| | | | |
|---|---|---|---|
| 8,235,421 B2 | 8/2012 | Biscan | |
| 8,444,174 B1 | 5/2013 | Miller et al. | |
| 10,077,574 B1 | 9/2018 | Currid | |
| 10,414,322 B1* | 9/2019 | Coulter | B62D 63/064 |
| 10,683,047 B1* | 6/2020 | Brown | B62D 63/062 |
| 11,254,380 B1* | 2/2022 | Ritter | B62D 27/02 |
| 2005/0280272 A1* | 12/2005 | Vokey | B62D 63/061 |
| | | | 296/25 |
| 2008/0089769 A1 | 4/2008 | Cook | |
| 2008/0211259 A1 | 9/2008 | Nadeau | |
| 2009/0001756 A1* | 1/2009 | Dempsey | B60P 3/341 |
| | | | 280/415.1 |
| 2010/0230999 A1 | 9/2010 | Setzer | |
| 2010/0319742 A1* | 12/2010 | Prusmack | B62D 63/062 |
| | | | 135/88.13 |
| 2011/0023863 A1 | 2/2011 | Andretich | |
| 2012/0292890 A1* | 11/2012 | Lomas | B62D 63/061 |
| | | | 280/656 |
| 2013/0241176 A1* | 9/2013 | Dempsey | B60P 3/341 |
| | | | 135/88.13 |
| 2015/0013923 A1 | 1/2015 | Howe | |
| 2016/0031502 A1* | 2/2016 | Hall | B62D 63/062 |
| | | | 280/415.1 |
| 2016/0152289 A1* | 6/2016 | Leisner | B60P 1/43 |
| | | | 280/789 |
| 2017/0029074 A1 | 2/2017 | Darling | |
| 2017/0341562 A1 | 11/2017 | Knight | |
| 2018/0093726 A1 | 4/2018 | Nehring | |
| 2018/0346042 A1 | 12/2018 | Elliott et al. | |
| 2020/0331548 A1 | 10/2020 | Niemela et al. | |
| 2021/0147018 A1 | 5/2021 | Jones | |
| 2021/0197704 A1 | 7/2021 | Kliegle | |
| 2022/0060144 A1* | 2/2022 | Phelps | B62D 33/0207 |

\* cited by examiner

TOWABLE TRAILERS AND MOTORIZED HOMES WITH AN EXOSKELETON

CROSS-REFERENCE TO RELATED APPLICATION

This application is a continuation of U.S. patent application Ser. No. 16/901,586, filed Jun. 15, 2020, which is a continuation application of U.S. patent application Ser. No. 16/105,187, filed Aug. 20, 2018, issued as U.S. Pat. No. 10,683,047 on Jun. 16, 2020, which claims priority to Provisional Application No. 62/547,495, filed Aug. 18, 2017, all of which are herein incorporated by reference in their entireties.

SUMMARY

Certain embodiments of the present disclosure describe a trailer with an internal frame and an external frame (e.g., exoskeleton). The external frame may provide increased structural strength, increased protection of external panels, and/or a source to attach a variety of accessories and features.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

Figure 1:
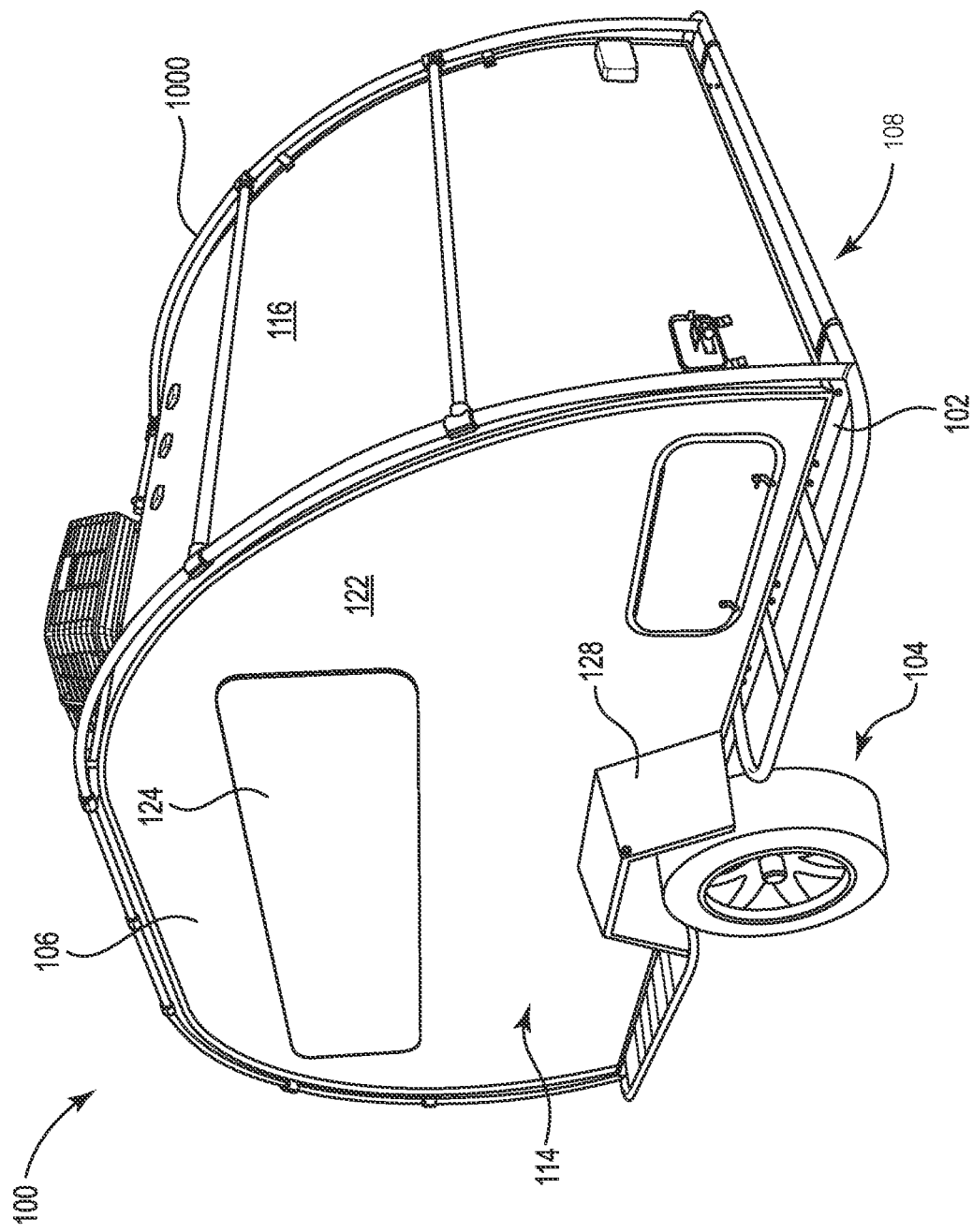
FIG. 1 shows a perspective view of a trailer, in accordance with certain embodiments of the present disclosure.

While the disclosure is amenable to various modifications and alternative forms, specific embodiments have been shown by way of example in the drawings and are described in detail below. The intention, however, is not to limit the disclosure to the particular embodiments described but instead is intended to cover all modifications, equivalents, and alternatives falling within the scope the appended claims.

DETAILED DESCRIPTION

The present disclosure describes various embodiments of a towable trailer with an internal frame and an external frame. The external frame can provide increased structural strength, increased protection of external panels, and/or a source to attach a variety of accessories and features.

Figure 2:
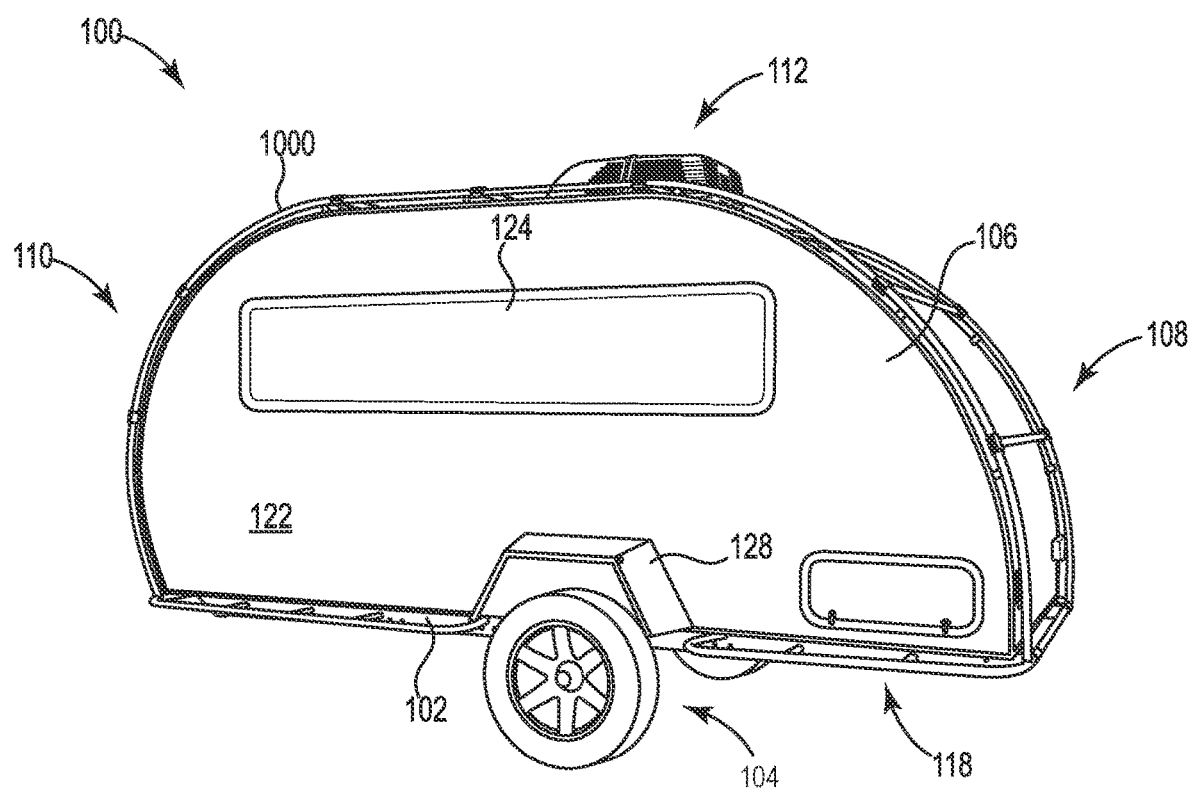
FIG. 2 shows a side view of the trailer of FIG. 1, in accordance with certain embodiments of the present disclosure.

FIG. 1 shows a perspective view of a trailer 100 adapted to be towed by a vehicle and used for travel, camping, etc. FIG. 2 shows a side view of the trailer 100. The trailer 100 includes a chassis 102 with an axle (not shown) coupled to wheels 104. The chassis 102 can be coupled to a trailer tongue (not shown), which is configured to be connected to a hitch on the vehicle so that the trailer 100 can be towed by the vehicle.

The chassis 102 supports a housing 106, which has a front end 108, a rear end 110, a central portion 112, a window side 114, an entry side (not shown), a roof 116, and a bottom side 118. The trailer tongue would extend from the front end 108 such that, when the trailer 100 is coupled to a vehicle, the front end 108 of the housing 106 is positioned closest to the vehicle. In some embodiments, the housing 106 is positioned on the chassis 102 such that the wheels 104 are positioned at or near the central portion 112 of the housing 106. The housing 106 includes an internal frame 120 (shown in FIG. 4), which is coupled to various external and internal panels of the housing 106. External panels 122 form an exterior shape, which is shown in FIGS. 1-2. Although the window side 114 of the housing 106 is shown as having a profile that is semi-tear drop shaped, the disclosure is not limited to such a shape, and the housing 106 could form other shapes such as those more rectangular, semicircle, etc.

FIGS. 1 and 2 show that the housing 106 includes a window 124 positioned on the window side 114. The window 124 is shown as being rectangular shaped such that it is elongated between the front end 108 and the rear end 110. In embodiments, the window 124 is 8-12 feet long, 9-11 feet long, 9.5-10.5 feet long, or 10 feet long. In some embodiments, the housing 106 includes multiple windows or no windows. The internal panels 126 (shown in FIG. 4) can form a finished interior region. The interior region can include, among other things, a sleeping area, a kitchen area with various built-in appliances (e.g., refrigerator, oven, stovetop), and a seating area with various built-ins (e.g., table, chair, bench). As shown in FIGS. 1-2, the trailer 100 can include fenders 128 coupled to the housing 106 and positioned above the wheels 104.

Figure 3:
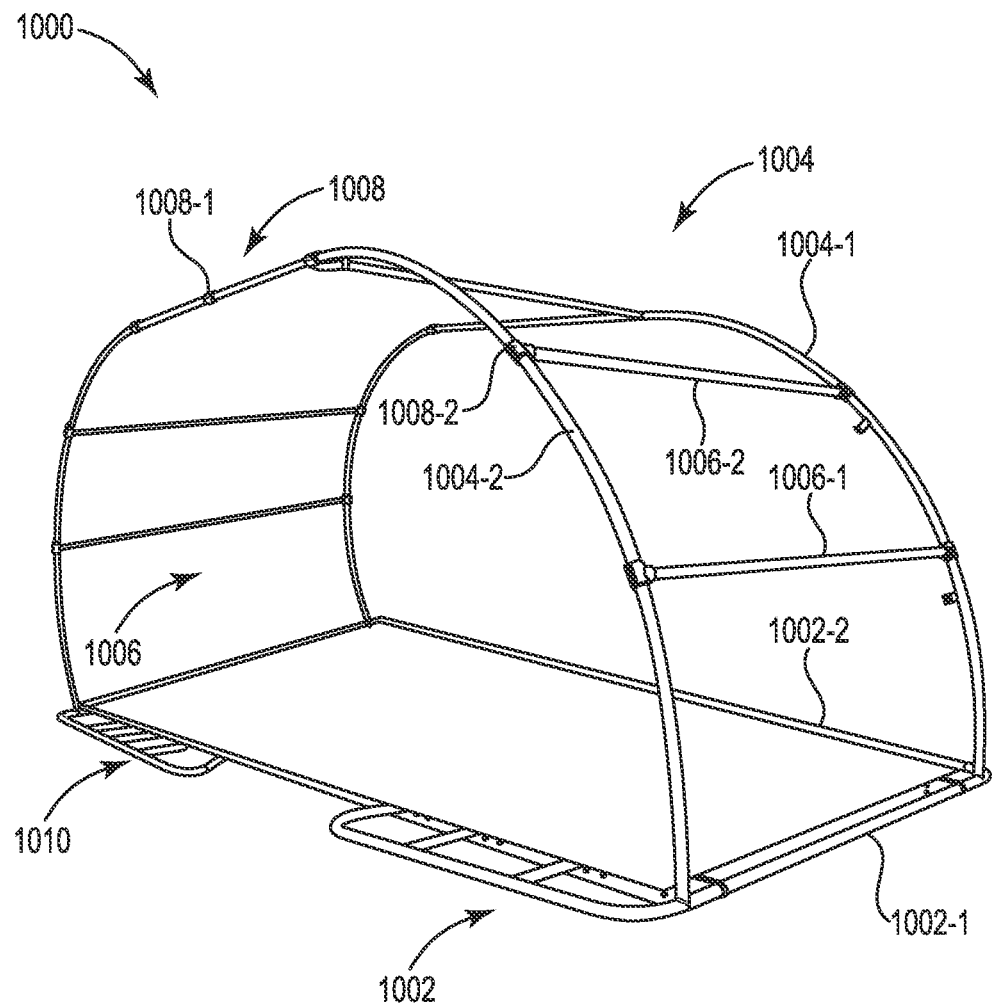
FIG. 3 shows a perspective view of the external frame of FIGS. 1-2, in accordance with certain embodiments of the present disclosure.

FIGS. 1-2 show an external frame 1000 (e.g., an exoskeleton) coupled to the chassis 102 and the housing 106. The external frame 1000, which is shown in greater detail in FIG. 3, includes a bottom portion 1002 that is positioned near the bottom side 118 of the housing 106, a top portion 1004 that extends from the bottom portion 1002, a cross-support portion 1006, and a coupling portion 1008.

The external frame 1000 comprises various frame members coupled together. The bottom portion 1002 is formed by a plurality of bottom frame members 1002-1, 1002-2, etc.; the top portion 1004 is formed by a plurality of top frame members 1004-1, 1004-2, etc.; the cross-support portion 1006 is formed by a plurality of cross-support frame members 1006-1, 1006-2, etc.; and the coupling portion 1008 is formed by a plurality of coupling members 1008-1, 1008-2, etc. Together, the frame members are coupled together to form the external frame 1000. The frame members can be coupled together via fasteners (e.g., screws, bolts, and the like), welds, and the like. As shown in FIGS. 1-2, the external frame 1000 can be shaped such that it substantially matches the shape of the housing 106. For example, the bottom portion 1002 and the top portion 1004 of the external frame 1000 substantially match the profile of the window side 114 and the entry side of the housing 106, where the top portion 1004 of the external frame 1000 is semi-tear-drop shaped. In addition to giving the trailer 100 what some might find to be a more rugged appearance, the external frame 1000 protects the external panels 122 from scratches, dents, etc., and/or adds structural strength to that provided by the internal frame 120 and/or provided by other portions of the trailer 100.

Figure 4:
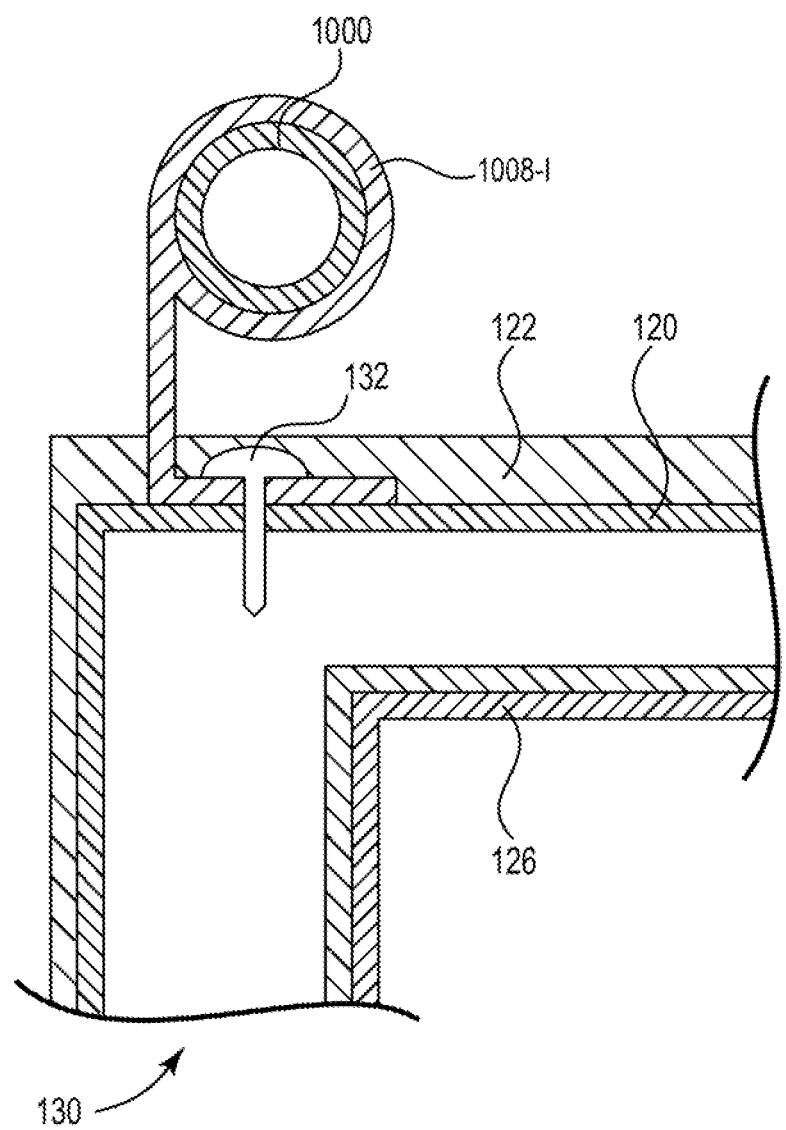
FIG. 4 shows a partial cross-section view of an internal frame and external frame, in accordance with certain embodiments of the present disclosure.

In some embodiments, the frame members have a circular cross section (as shown in FIG. 4) although other cross-section shapes (e.g., square, rectangular, oval) are contemplated. In some embodiments, the frame members are made of materials such as various forms of steel and/or aluminum. In some embodiments, the frame members are coated (e.g., powder coated, polymer coated). In some embodiments, the frame members are hollow.

The bottom portion 1002 and bottom frame members 1002-1, 1002-2, etc., can form one or more platforms 1010 on one or either side of the wheels 104 to permit someone to step or sit on. The cross-support frame members 1006-1, 1006-2, etc., are positioned between and couple to the top frame members 1004-1, 1004-2, etc. The coupling members 1008-1 can extend from the bottom portion 1002, the top portion 1004, and/or the cross-support portion 1006 to couple the external frame 1000 to the chassis 102, the housing 106, and/or the internal frame 120 (as shown in FIG. 4). The coupling frame members, 1008-1, etc., can be arranged to provide space between the housing 106 and the external frame 1000.

FIG. 4 shows a cross-section view of the internal frame 120 and the external frame 1000. As described above, the external panels 122 and the internal panels 126 of the housing 106 are coupled to the internal frame 120 at select locations. The internal frame 120 can be made of materials such as aluminum, steel, other metals, wood, polymer, composites, etc. Walls 130 of the housing 108 are formed by the internal frame 120 and insulation (e.g., foam, fiberglass), which can fill or surround portions of the internal frame 120. In some embodiments, the internal panels 126 are laminated onto the walls 130 to form the interior side of the walls 130, and the external panels 122 are laminated onto the walls to form the exterior side of the walls 130. The walls 130 can be cut to allow for installation of various features (e.g., the window 128, the entry). As shown in FIG. 4, the external frame 1000 can be coupled to the internal frame 120 via the coupling frame members, 1008-1, etc. In certain embodiments, the coupling frame members, 1008-1, etc., are secured to the internal frame 120 by one or more fasteners 132 (e.g., screws, bolts, and the like) or by one or more welds. As shown in FIG. 4, the external frame 1000 is at least partially surrounded by the coupling frame member 1008-1 and can be coupled together via fasteners, welds, and the like. In some embodiments, the internal frame 124 and the external frame 1000 are made of different materials.

Figure 5:
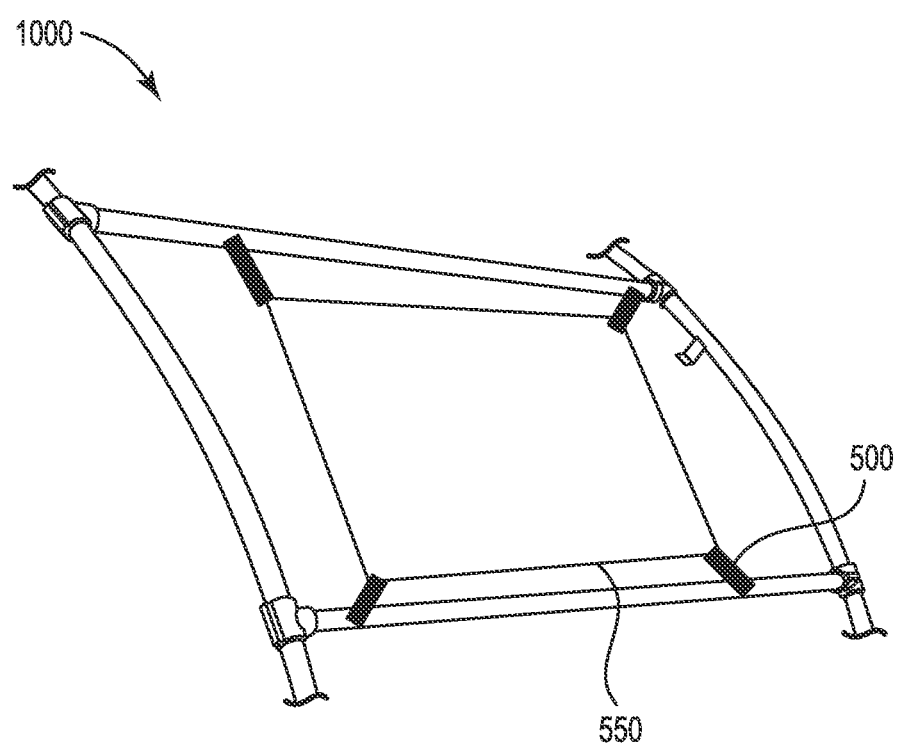
FIG. 5 shows an example of one of the various accessories attachable to the external frame of FIGS. 1-4, in accordance with certain embodiments of the present disclosure.

As mentioned above, the external frame 1000 can be used as a source to attach a variety of accessories and features. FIG. 5 provides an example of one of the types of accessories and features that can be coupled to the external frame 1000. An attachment device 500 is used to attach the various accessories and features. The attachment device 500 can be a device that is separate from the external frame 1000 and the accessory itself, can be a device that forms part of the external frame 1000 and is positioned at pre-determined points or slidable along the external frame 1000, and/or can be a device that forms part of the accessory itself. In some embodiments, the attachment device 500 is a multi-component device with at least one component of the device forming part of the external frame 1000 and at least one other component of the device forming part of the accessory. The various components can be configured to releasably couple to permit the accessory to be attached and released from the external frame 1000.

FIG. 5 shows a solar panel 550 coupled to frame members of the external frame 1000 via attachment devices 500. The solar panel 500 can be used as a supplementary or primary source of electricity for the trailer 100. Regardless of whether the solar panel 550 is a primary or supplementary source, the trailer 100 can include various connectors for attaching the trailer's electrical system to a power source (e.g., local electrical grid, generator, solar panel 550). The solar panel 550 can be coupled to the external frame 1000 at the top frame members 1004-1, 1004-2 and positioned at the top portion 1004 of the external frame 1000 so that the solar panel 550 is exposed to adequate sun light.

In other embodiments, an awning can be coupled to frame members of the external frame 1000 attachment devices 500. The awning can be used as a cover to provide shade when the trailer 100 is camped. On one end, the awning can be coupled to the external frame 1000 via attachment devices 500 at the top frame members 1004-1, 1004-2, and at the other end, the awning can include attached poles. One end of the poles can be placed in the ground and the other end can be attached to the awning to provide shade. In some embodiments, one or more screen sections can be added to provide a screened-in area and/or a wind barrier.

In addition to the accessories and features described above, the external frame 1000 and attachment device 500 can be used as a source of attachment for a variety of other accessories (e.g., tents, bike racks, bicycles, shower tubes, wind turbines, add-a-room structures).

Although the features described above are described in the context of a towable trailer, various features could be incorporated into a motorized home. For example, a motorized home could include an external frame (such as the external frame 1000) that provides what some might find to be a more rugged appearance, protects external panels from scratches, dents, etc., and adds structural strength to that provided by the internal frame.

Various modifications and additions can be made to the embodiments disclosed without departing from the scope of this disclosure. For example, while the embodiments described above refer to particular features, the scope of this disclosure also includes embodiments having different combinations of features and embodiments that do not include all of the described features. Accordingly, the scope of the present disclosure is intended to include all such alternatives, modifications, and variations as falling within the scope of the claims, together with all equivalents thereof.

What is claimed is:

1. A recreational vehicle comprising:
   a chassis;
   a housing supported by the chassis, the housing including a first side wall, a second side wall, a roof, and an internal frame, the internal frame is positioned between interior panels and exterior panels of the housing; and
   an external frame including a pair of top frame members spaced from the housing at a fixed distance and cross-support frame members coupled between the top frame members, wherein the external frame is coupled to the housing via coupling members that are attached to the external frame at one end and to the housing at the other end.

2. The recreational vehicle of claim 1, wherein the coupling members are coupled between the external frame and the internal frame.

3. The recreational vehicle of claim 2, wherein the coupling members are coupled to the internal frame via fasteners.

4. The recreational vehicle of claim 1, wherein the recreational vehicle is a towable trailer.

5. The recreational vehicle of claim 1, wherein the pair of top frame members are shaped to substantially match a shape of the housing adjacent to the pair of top frame members.

6. The recreational vehicle of claim 1, wherein the top frame members have a circular cross-section.

7. The recreational vehicle of claim 1, wherein the housing has a semi-tear-drop side profile.

8. The recreational vehicle of claim 1, further comprising a single axle and two wheels.

9. The recreational vehicle of claim 8, wherein the single axle supports the chassis.

10. The recreational vehicle of claim 1, wherein first side wall includes a single window cutout.

11. The recreational vehicle of claim 1, wherein the internal frame comprises aluminum.

12. The recreational vehicle of claim 11, wherein the external frame comprises metal.

13. The recreational vehicle of claim 1, wherein the internal frame comprises wood.

14. The recreational vehicle of claim 13, wherein the internal frame comprises metal.

15. The recreational vehicle of claim 1, wherein the external frame is powder-coated.

16. The recreational vehicle of claim 1, further comprising means for coupling the external frame to the internal frame.

17. The recreational vehicle of claim 1, further comprising a single axle coupled to two wheels and the chassis, and further comprising a fender coupled to the housing and positioned directly over one of the wheels.

\* \* \* \* \*